(12) United States Patent
Shevde et al.

(10) Patent No.: US 10,122,215 B2
(45) Date of Patent: Nov. 6, 2018

(54) METHOD AND APPARATUS FOR CLOSED LOOP POWER ESTIMATION FOR DETERMINATION OF OPTIMAL PLACEMENT OF A POWER RECEIVE UNIT ON A POWER TRANSMIT UNIT WITH VISUAL AND/OR HAPTIC FEEDBACK

(71) Applicant: QUALCOMM Incorporated, San Diego, CA (US)

(72) Inventors: Sumukh Ashok Shevde, Carlsbad, CA (US); Francesco Carobolante, Carlsbad, CA (US); Joseph Najib Maalouf, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 15/081,092

(22) Filed: Mar. 25, 2016

(65) Prior Publication Data
US 2017/0047783 A1 Feb. 16, 2017

Related U.S. Application Data

(60) Provisional application No. 62/205,508, filed on Aug. 14, 2015.

(51) Int. Cl.
| H01F 27/42 | (2006.01) |
| H01F 37/00 | (2006.01) |
| H01F 38/00 | (2006.01) |
| H02J 50/12 | (2016.01) |
| H04B 5/00 | (2006.01) |

(52) U.S. Cl.
CPC ............ *H02J 50/12* (2016.02); *H04B 5/0037* (2013.01)

(58) Field of Classification Search
CPC . H02J 5/005; H02J 7/025; H02J 17/00; B60L 11/182; H01F 38/14
See application file for complete search history.

(56) References Cited

U.S. PATENT DOCUMENTS

| 2012/0149307 A1* | 6/2012 | Terada ................ H02J 7/025 455/66.1 |
| 2013/0200165 A1 | 8/2013 | Downie et al. |
| 2013/0342024 A1* | 12/2013 | Byun .................. H02J 5/005 307/104 |
| 2014/0015330 A1* | 1/2014 | Byun .................. H02J 5/005 307/104 |
| 2014/0125139 A1* | 5/2014 | Wang .................. H02J 7/025 307/104 |

(Continued)

OTHER PUBLICATIONS

International Search Report and Written Opinion—PCT/US2016/041923—ISA/EP—dated Oct. 6, 2016.

*Primary Examiner* — Quan Tra
(74) *Attorney, Agent, or Firm* — Knobbe, Martens, Olson & Bear, LLP

(57) ABSTRACT

An apparatus for receiving wireless power is provided. The apparatus comprises a coupler configured to receive a first amount of wireless power via a wireless field generated by a wireless power transmitter. The apparatus comprises a sensor circuit configured to measure the first amount of wireless power. The apparatus comprises a controller configured to instruct a feedback circuit to provide an indication to a user based on a comparison of the first amount of wireless power measured by the sensor circuit to a power threshold.

30 Claims, 3 Drawing Sheets

(56) References Cited

U.S. PATENT DOCUMENTS

2014/0145515 A1 5/2014 Jung et al.
2016/0072309 A1* 3/2016 Chu .................. H02J 50/12
 307/104

* cited by examiner

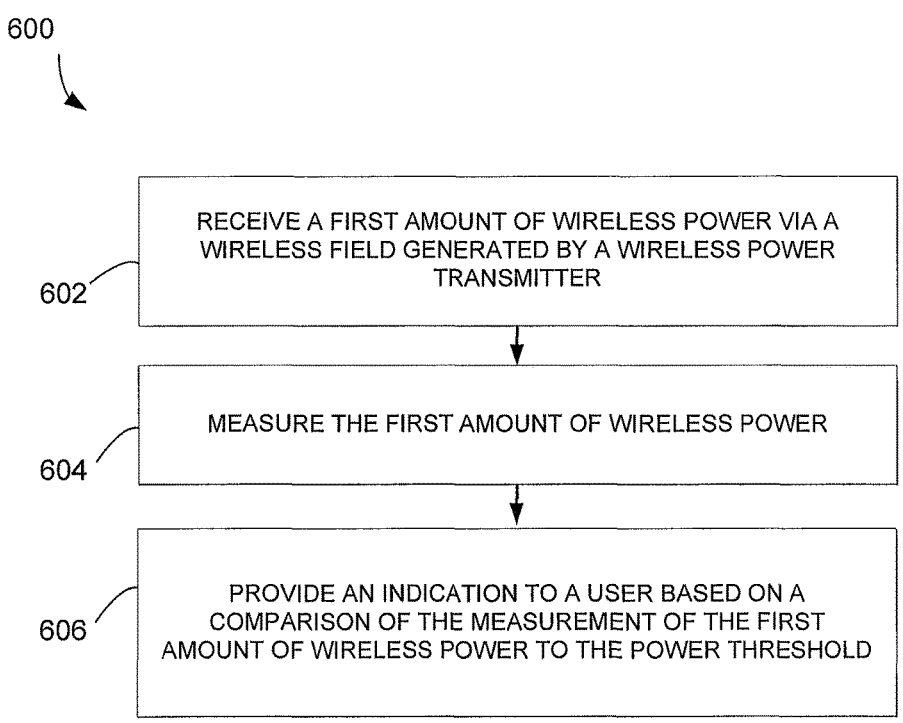

METHOD AND APPARATUS FOR CLOSED LOOP POWER ESTIMATION FOR DETERMINATION OF OPTIMAL PLACEMENT OF A POWER RECEIVE UNIT ON A POWER TRANSMIT UNIT WITH VISUAL AND/OR HAPTIC FEEDBACK

CROSS REFERENCE TO RELATED APPLICATIONS

This Application claims priority to Provisional Application No. 62/205,508 entitled "METHOD AND APPARATUS FOR CLOSED LOOP POWER ESTIMATION FOR DETERMINATION OF OPTIMAL PLACEMENT OF A POWER RECEIVE UNIT ON A POWER TRANSMIT UNIT WITH VISUAL AND/OR HAPTIC FEEDBACK" filed Aug. 14, 2015. The disclosure of Provisional Application No. 62/205,508 is hereby expressly incorporated in its entirety by reference herein.

FIELD

This application is generally related to wireless power transfer, and more specifically to methods and apparatuses for wireless power receiver circuitry.

BACKGROUND

Wireless power transfer from wireless power transmitters to wireless power receivers allows powering or charging devices without the use of wired charging connections and is fast becoming a ubiquitous technology. Accordingly, methods and apparatuses for wireless power receiver circuitry are desirable.

SUMMARY

According to some implementations, an apparatus for receiving wireless power is provided. The apparatus comprises a coupler configured to receive a first amount of wireless power via a wireless field generated by a wireless power transmitter. The apparatus comprises a sensor circuit configured to measure the first amount of wireless power. The apparatus comprises a controller configured to instruct a feedback circuit to provide an indication to a user based on a comparison of the first amount of wireless power measured by the sensor circuit to a power threshold.

In some other implementations, a method for receiving wireless power is provided. The method comprises receiving a first amount of wireless power via a wireless field generated by a wireless power transmitter. The method comprises measuring the first amount of wireless power. The method comprises providing an indication to a user based on a comparison of the first amount of wireless power to a stored power threshold.

In yet other implementations, a non-transitory, computer-readable medium comprising code is provided. The code, when executed, causes the apparatus for receiving wireless power to receive a first amount of wireless power via a wireless field generated by a wireless power transmitter. The code, when executed, causes the apparatus to measure the first amount of wireless power. The code, when executed, causes the apparatus to provide an indication to a user based on a comparison of the first amount of wireless power to a stored power threshold.

In yet other implementations, an apparatus for receiving wireless power is provided. The apparatus comprises means for receiving a first amount of wireless power via a wireless field generated by a wireless power transmitter. The apparatus comprises means for measuring the first amount of wireless power. The apparatus comprises means for storing a power threshold. The apparatus comprises means for instructing a feedback circuit to provide an indication to a user based on a comparison of the first amount of wireless power to the power threshold.

BRIEF DESCRIPTION OF THE DRAWINGS

FIG. 5 is a register configured to store a plurality of selectable power thresholds of a received power level for boot up of one or more portions of the PRU of FIG. 4, in accordance with some implementations.

FIG. 6 is a flowchart depicting a method for wireless power transfer by a PRU, in accordance with some implementations.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured, or coupled by a "receive coupler" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
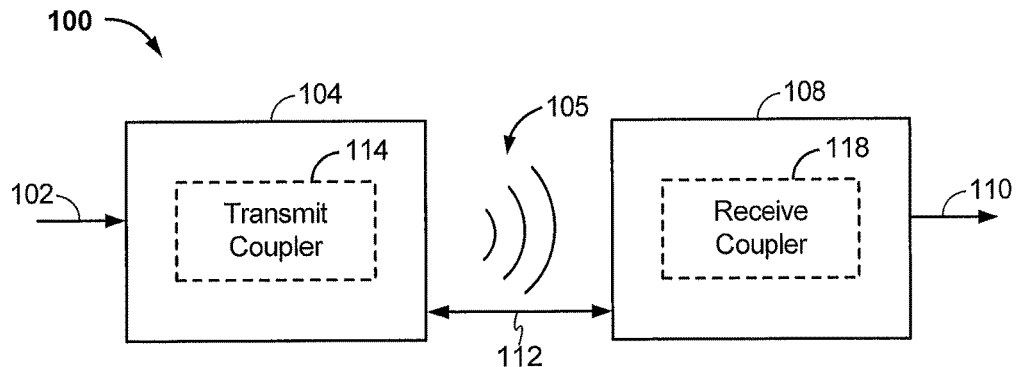
FIG. 1 is a functional block diagram of a wireless power transfer system, in accordance with some implementations.

FIG. 1 is a functional block diagram of a wireless power transfer system 100, in accordance with some exemplary implementations. Input power 102 may be provided to a transmitter 104 from a power source (not shown) to generate a wireless (e.g., magnetic or electromagnetic) field 105 via a transmit coupler 114 for performing energy transfer. The receiver 108 including a receive coupler 118 may receive power when the receiver 108 is located in the wireless field 105 produced by the transmitter 104. The wireless field 105 corresponds to a region where energy output by the transmitter 104 may be captured by the receiver 108, A receiver 108 may couple to the wireless field 105 and generate output power 110 for storing or consumption by a device (not shown in this figure) coupled to the output power 110. Both the transmitter 104 and the receiver 108 are separated by a distance 112.

In some implementations, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be reduced. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space. Resonant inductive coupling techniques may thus allow for improved efficiency and power transfer over various distances and with a variety of inductive coupler configurations.

In some implementations, the wireless field 105 corresponds to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114. Efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118.

Figure 2:
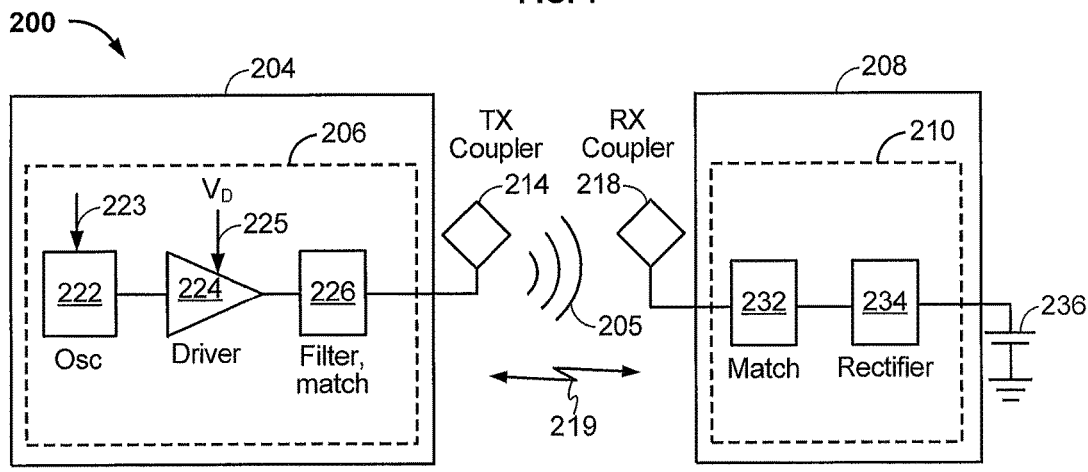
FIG. 2 is a functional block diagram of a wireless power transfer system, in accordance with some other implementations.

FIG. 2 is a functional block diagram of a wireless power transfer system 200, in accordance with some other exemplary implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of the transmit circuitry 206 to the impedance of the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
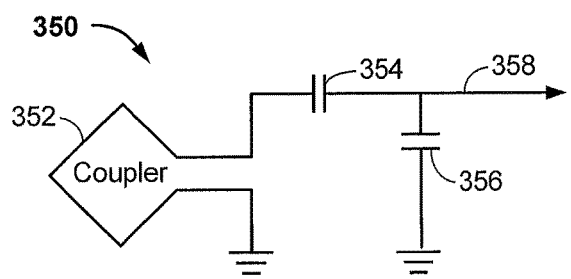
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some exemplary implementations. As illustrated in FIG. 3, transmit or receive circuitry 350 may include a coupler 352. The coupler 352 may also be referred to or be configured as a "conductor loop", a coil, an inductor, an antenna, or a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both transmit and receive couplers increase. For transmit couplers, the signal 358, with a frequency that substantially corresponds to the resonant frequency of the coupler 352, may be an input to the coupler 352.

In some implementations, wireless power transmit units (PTUs), also known as wireless power transmitters 104, 204, are configured to provide amounts of power based on a 'class' of the transmitter 104, 204 in an effort to standardize compatibility between the PTU and a wireless power receive unit (PRU), also known as a wireless power receiver 108, 208. In certain cases, where a PTU has a larger charging surface to support higher power levels and bigger PRUs there may be areas in which the magnetic field is not completely uniform or at least has some variance in some areas (e.g., lower at the edges). These areas may not have any impact on larger PRUs with larger receive couplers that can average induced voltages over a larger area. However, PRUs with smaller receive couplers may be positioned on the charging surface such that the entirety of the receive coupler is positioned in an area with lower field strength. Particularly in cases where the PRU has a nearly or completely discharged battery, received power may be required to satisfy some minimum threshold for initiating system and/or communication circuit turn-on in order to set up and execute a charging session. If the smaller PRU (e.g., a PRU with a receiver coupler) is in one of these areas with reduced field strength (e.g., placed near an edge, etc.), there may not be sufficient power for initiating system and/or communication circuit turn-on in order to set up and execute the charging session. Therefore, the smaller PRU may never be charged when placed in certain positions even though it is on a larger charging surface capable of charging much larger receiver devices. The present application contemplates utilizing a closed loop power measurement and/or estimation to determine if the power received by the PRU, when placed at a particular location on the PTU, satisfies a minimum amount of power needed to initiate a system boot up for handshaking (e.g., communication and charging session setup and negotiation) and charging purposes. If the wireless power received does not satisfy the minimum threshold, the PRU may be configured to provide one or more of visual, audible, and/or haptic feedback to an end user to reposition the PRU at a different location on the PTU. In some implementations, the power required to power the feedback to the end user may be less than the power required to initiate the system boot up. Furthermore, in these cases the power required to power the feedback may be provided wirelessly via the field, such that while the receiver may be coupling power at a level insufficient for initiating the system boot up for handshaking, it may be coupling power at a level sufficient to provide the feedback to the end user.

Figure 4:
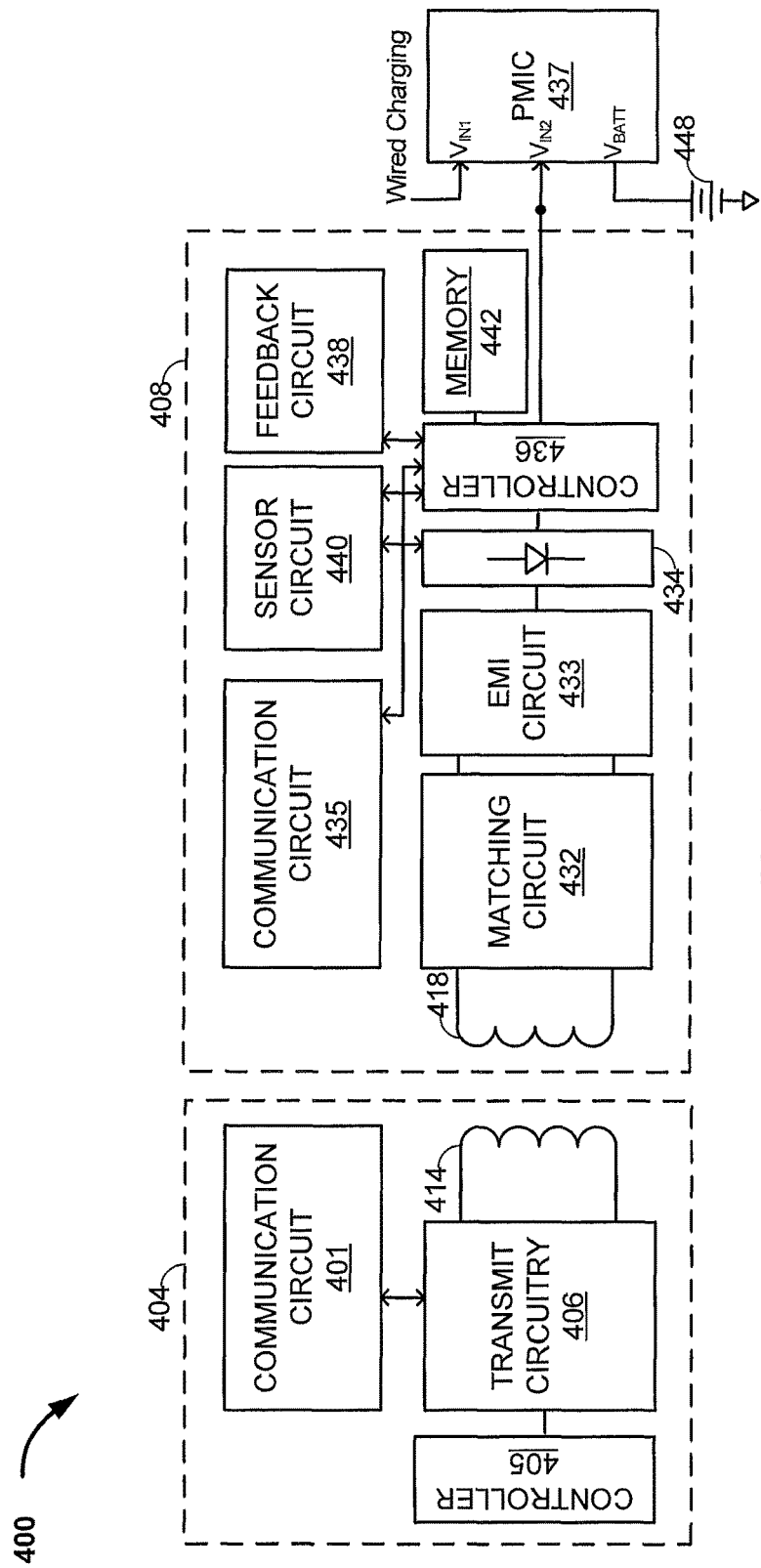
FIG. 4 is another functional block diagram of a wireless power transfer system 400, in accordance with some implementations.

FIG. 4 is another functional block diagram of a wireless power transfer system 400, in accordance with some implementations. FIG. 4 shows a power transmit unit (PTU) 404 and a power receive unit (PRU) 408. The PTU 404 may correspond to the transmitters 104, 204 as previously described in connection with FIGS. 1 and 2, respectively. Similarly, the PRU 408 may correspond to the receivers 108, 208 as previously described in connection with FIGS. 1 and 2, respectively. In some implementations, the PTU 404 may be compatible with a particular standard for wirelessly transferring power and the PRU 408 may be similarly compatible with that standard.

The PTU 404 may include transmit circuitry 406 configured to drive at least one coupler 414 with an alternating current to generate an alternating wireless field (e.g., a magnetic field) for wirelessly transferring power to the PRU 408. Although only one coupler 414 is shown, the present application contemplates implementations having a plurality of couplers, perhaps arranged in an array, or in a regular or irregular grid on a charging surface (not shown) of the PTU 408.

The PTU 404 further includes a controller 405 configured to control one or both of the transmit circuitry 406 and a communication circuit 401 as described in connection with any figure below.

The PTU 404 further includes the communication circuit 401, which may be a Bluetooth low energy (BLE) communication circuit configured to communicate in accordance with the BLE communications standard. However, the present application is not so limited and any other communications standard may be utilized by the communication circuit 401.

To differentiate between different capabilities of different PTUs operating according to a particular standard, charging classes of PTUs may be defined based on an amount of power that the PTU 404 is configured to transmit. Examples of possible charging classes for PTUs are shown in Table 2 below. The PTU classes may further be based on desired compatibility with a particular PRU having certain capabilities. PRUs with different capabilities may be differentiated by defined categories of PRUs. Examples of such categories of PRUs are shown in Table 1 below, and/or by limitations of the components of the PTU 404.

TABLE 1

| PRU Category | Max Output Power of PRU Coupler | Example Application |
| --- | --- | --- |
| Category 1 | 1.75 W | Bluetooth Headset |
| Category 2 | 3.5 W | Feature Phone |
| Category 3 | 6.5 W | Smart Phone |
| Category 4 | 13 W | Tablet |
| Category 5 | 25 W | Small Form Factor Laptop |
| Category 6 | 37.5 W | Regular Laptop |
| Category 7 | 50 W | — |

TABLE 2

| PTU Class | Max Input Power | Min. Category Support Requirements | Min. Value for Max. Number of Devices Supported |
| --- | --- | --- | --- |
| Class 1 | 2 W | 1 × Category 1 | 1 × Category 1 |
| Class 2 | 10 W | 1 × Category 3 | 2 × Category 2 |
| Class 3 | 16 W | 1 × Category 4 | 2 × Category 3 |
| Class 4 | 33 W | 1 × Category 5 | 3 × Category 3 |
| Class 5 | 50 W | 1 × Category 6 | 4 × Category 3 |
| Class 7 | 70 W | 1 × Category 7 | 5 × Category 3 |

The PRU 408 may include a coupler 418 configured to receive a first amount of wireless power via a wireless field (e.g., a magnetic field) generated by a wireless power transmitter (e.g., generated by the coupler 414). Although only one coupler 418 is shown, the present application is not so limited and the PRU 408 may include a plurality of couplers 418. The coupler 418 may also be referred to as "means for receiving a first amount of wireless power via a wireless field generated by a wireless power transmitter." The coupler 418 may be connected to a matching circuit 432, which matches an impedance of the coupler 418 to the impedance of the remainder of the receive chain in order to maximize the amount of wirelessly received power available for powering or charging the PRU 408 and/or an attached device where the PRU 408 and the attached device are not the same device. The matching circuit 432 is electrically connected to an electromagnetic interference (EMI) filtering circuit 433, which is configured to remove any frequency content of the alternating current output by the matching circuit 432 that may cause EMI in excess of any applicable regulatory limits. The EMI filtering circuit 433 is electrically connected to a rectifier circuit 434, which is configured to rectify the alternating current and output a direct current. The rectifier circuit 434 is operably connected to a controller 436. The controller 436 may be configured to control one or more measurements regarding the wirelessly received power, to control a communication circuit 435, to control a feedback circuit 438, and/or to selectively output power to a power management integrated circuit (PMIC) 437. In some implementations, the PRU 408 may not include the PMIC 437. In such implementations, the controller 436 may be configured to directly provide charging power to the battery 448. In some such implementations, the controller 436 may also be a controller of the communication circuit 435. For example, the controller 436 may be configured to communicate with and/or control one or more operations of the communication circuit 435, the sensor circuit 440, and/or the feedback circuit 438. In some implementations, the controller 436 may also be referred to as, or comprise at least a portion of "means for instructing a feedback circuit to provide an indication to a user based on a comparison of the first amount of wireless power to the power threshold," and/or "means for selecting the power threshold" based on one or more operating conditions of the apparatus. Where the controller 436 includes a memory for storing a plurality of power thresholds, the controller 436 may also be known as or comprise at least a portion of "means for storing a power threshold." Where the controller 436 does not include a memory for storing the plurality of power thresholds, the PRU 408 may additionally include a memory 442, which may also be known as or comprise at least a portion of "means for storing a power threshold."

The communication circuit 435 is configured to communicate with the communication circuit 401 of the PTU 404 for setting up a communication channel between the PTU 404 and the PRU 408 and for negotiating and/or optimizing charging conditions between the PTU 404 and the PRU 408.

The sensor circuit 440 is configured to measure a first amount of wireless power received by the coupler 418. In some implementations, the sensor circuit 440 may comprise an analog-to-digital converter (ADC). The sensor circuit 440 may be connected to the rectifier circuit 434 and to the controller 436. The sensor circuit 440 may be configured to measure the first amount of wireless power as it is presented at an output of the rectifier circuit 434 and provide at least an indication of this measurement to the controller 436. In some implementations, the sensor circuit 440 may comprise or form at least a portion of "means for measuring the first amount of wireless power."

The feedback circuit 438 may be configured to provide an indication to a user based on a comparison of the first amount of wireless power measured by the sensor circuit 440 to a selected one of the plurality of power thresholds that may be stored in a memory. The indication may comprise one or more indicators (e.g., light emitting diodes or LEDs) illuminated in response to the first amount of wireless power measured by the sensor circuit 440 either satisfying or not satisfying the selected one of the plurality of power thresholds. For example, one or more LEDs may illuminate statically or in some predetermined pattern if the wireless power measured by the sensor circuit 440 satisfies the power threshold, indicating a satisfactory charging position and/or condition of the PRU 408. Alternatively, the one or more LEDs may illuminate statically or in some predetermined pattern if the wireless power measured by the sensor circuit 440 does not satisfy the power threshold, indicating an unsatisfactory charging position and/or condition of the PRU 408. In some other implementations, the indication comprises haptic feedback in response to the first amount of wireless power measured by the sensor circuit 440 satisfying or not satisfying the selected one of the plurality of power thresholds. For example, the feedback circuit 438 may include a vibrating portion which may buzz or vibrate for brief periods of time if the wireless power measured by the sensor circuit 440 satisfies the power threshold, indicating a satisfactory charging position and/or condition of the PRU 408. Alternatively, the vibrating portion may buzz or vibrate for brief periods of time if the wireless power measured by the sensor circuit 440 does not satisfy the power threshold, indicating an unsatisfactory charging position and/or condition of the PRU 408. The selected one of the plurality of power thresholds may be at least a minimum power required to boot up the PRU 408 or establish communications with the wireless power transmitter (PTU 404), or a combination thereof, especially when a battery 448 of the PRU 408 is dead or nearly discharged.

The PMIC 437 may be configured to receive power from the PRU 408 (e.g., at a $V_{IN2}$ pin) and/or from a wired charging power connection (e.g., at a $V_{IN1}$ pin) and output power to the battery 448 (e.g., via a $V_{BATT}$ pin). However, the PMIC 437 is not limited to the configuration shown and may have any configuration that allows for at least receiving power and selectively providing that power to at least the battery 448 or some other form of electrical energy storage.

Referring back to Tables 1 and 2, some wireless charging standards may require that a small category 1 PRU (e.g., a wearable technology) be capable of receiving wireless power from any class of PTU (e.g., any of Classes 1-6). For example, when the PRU 408 (e.g., a category 1 PRU) is placed on or within a charging region of the PTU 404 (e.g., a class 3 or 4 PTU), the uniformity of the magnetic field generated by one or more of the plurality of couplers 414, as well as the physical location of the PRU 408 with respect to the PTU 404, may determine the actual amount of power received by the PRU 408. In some implementations, a minimum threshold of power may be required to boot up and/or power one or more components of the PRU 408 (e.g., the controller 436, the communication circuit 435, and/or the feedback circuit 438) until an initial wireless charging session handshake and negotiation has been completed. Accordingly, there may be some circumstances where the PRU 408, placed within a charging region of the PTU 404, will not receive enough power to boot up (e.g., the field strength at a particular location in the charging region is lower and the receiver coupler 418 covers an area within that region of lower field strength). In such circumstances, the PRU 408 may not charge properly if a user is not informed of this issue and prompted to adjust the position of the PRU 408 with respect to the PTU 404. However, if the problem of determining that the PRU 408 receives enough power to satisfy the minimum threshold can be resolved, the user can be informed in the event that the PRU 408 should be moved to a different location within the charging region of the PTU 404. In some implementations, the sensor circuit 440 and the feedback circuit 438 may be adequately provided with power from the wirelessly received power at power levels that are insufficient to boot up the controller 436 (i.e., the power level for operating the sensor circuit 440 and the feedback circuit 438 may be lower than the power level for booting up the controller 436 and/or other portions of the PRU 408).

One such solution may rely on the ability of the PRU 408 to measure the power received and compare the measured received power against a programmable, storable and/or selectable minimum threshold value (see FIG. 5). In some implementations, the minimum threshold may be selected by the manufacturer based on the requirements of the PRU 408. Thus, the same setup may service many different devices based on the manufacturer selecting the appropriate minimum threshold from the stored plurality of selectable minimum threshold values. For example, the manufacture may preselect a minimum threshold of 200 mW for an activity tracker, or 700 mW for a smartwatch, etc. in some other implementations, the controller 436 may be configured to select the selected one of the plurality of power thresholds based on one or more operating conditions of the PRU 408.

In operation, when the PRU 408 is placed on the PTU 404 or in a charging region of the PTU 404, the PTU 404 may be in a beacon mode where the PTU 404 periodically transmits short bursts of wireless power (e.g., beacons). The PRU 408 may utilize these beacons to harvest wireless power in an attempt to turn on or boot up for charging parameter setup and negotiating purposes with the PTU 404. The sensor circuit 440 may measure the power received at the output of the rectifier circuit 434 and/or at any other point in the receive chain upstream of the rectifier circuit 434 and output an indication of that measured power. The controller 436 may be configured to compare this measured power or indication of the measured power against a signal indicative of the selected minimum threshold from the register stored in the memory of the controller 436. If the measured received power satisfies the programmed, stored, and/or selected minimum threshold value, then the controller 436 may proceed to boot up and turn on the communication circuit 435 for completing the handshake and/or charging session set up and negotiation process according to the applicable wireless charging standard. Where the power measured does not satisfy (e.g., is less than) the selected minimum threshold value, the controller 436 may provide a signal to a feedback circuit 438 for informing a user of the PRU 408 to reposition the PRU 408 with respect to the PTU 404. In some implementations, the feedback circuit 438 may be configured to turn on an LED, turn on one or more of a plurality of LEDs in a graded fashion, turn on some other indicator (not shown), and/or provide haptic feedback in the form of a vibration that lets the user know that the measured received power does or does not satisfy the selected minimum threshold value, depending on the implementation. In some implementations, the controller 436 may select this minimum threshold from a plurality of programmed or programmable values stored in a register or memory associated with the controller 436, as shown in more detail in connection with FIG. 5.

FIG. 5 is a register 500 configured to store a plurality of selectable power thresholds of a received power level for boot up of one or more portions of the PRU 408 of FIG. 4, in accordance with some implementations. For example, as previously described in connection with FIG. 4, the register stores a plurality of power thresholds, for example, 1000 milliwatts (mW), 875 mW, 750 mW, 625 mW, 500 mW, 375 mW, 250 mW, 125 mW. These are only example values and any actual minimum threshold may be stored, in any order, based on the requirements of the PRU 408. Another non-limiting example may include threshold from 100 mW to 1000 mW in 100 mW steps. The register 500 may be provide a single implementation that is compatible with PRUs having varying power requirements. By selecting one of the plurality of power thresholds at the time of manufacture (e.g., hard coding), manually by a user, or during operation by, e.g., the controller 436, the same controller 436, memory or ASIC chip may be utilized to provide the above-described control to many different types and categories of PRUs.

FIG. 6 is a flowchart 600 depicting a method for wireless power transfer by a PRU 408, in accordance with some implementations. The flowchart 600 depicted by FIG. 6 may correspond to an exemplary method carried out by the PRU 408 of FIG. 4. Although blocks may be described as occurring in a certain order, the blocks can be reordered, blocks can be omitted, and/or additional blocks can be added.

The flowchart 600 may begin with block 602, which includes receiving a first amount of wireless power via a wireless field generated by a wireless power transmitter. For example, the coupler 418 of the PRU 408 (FIG. 4) may be configured to receive a first amount of wireless power via a wireless field generated by a wireless power transmitter 404. The flowchart 600 may then proceed to block 604.

Block 604 includes measuring the first amount of wireless power. For example, the sensor circuit 440 may be configured to measure the first amount of wireless power. The flowchart 600 may then proceed to block 606.

Block 606 includes providing an indication to a user based on a comparison of the first amount of wireless power to a stored power threshold. For example, the controller 436 may be configured to instruct the feedback circuit 438 to provide an indication to a user based on a comparison of the first amount of wireless power measured by the sensor circuit 440 to the power threshold. The feedback may indicate the user should reposition the receiver in a charging area.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with die implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for receiving wireless power, comprising:
   a coupler configured to receive a first amount of wireless power via a wireless field generated by a wireless power transmitter;
   a sensor circuit configured to measure the first amount of wireless power; and
   a controller configured to instruct a feedback circuit to provide an indication on the apparatus to a user whether at least at least a minimum power required to boot up a controller of the apparatus or establish communications with the wireless power transmitter, or a combination thereof has been met based on a comparison of the first amount of wireless power measured by the sensor circuit to a power threshold.

2. The apparatus of claim 1, further comprising a memory configured to store the power threshold, wherein the power threshold is at least the minimum power required to boot up the apparatus or establish communications with the wireless power transmitter, or the combination thereof.

3. The apparatus of claim 1, wherein the indication comprises one or more indicators illuminated in response to the first amount of wireless power measured by the sensor circuit satisfying the power threshold.

4. The apparatus of claim 1, wherein the indication comprises one or more indicators illuminated in response to the first amount of wireless power measured by the sensor circuit not satisfying the power threshold.

5. The apparatus of claim 1, wherein the indication comprises haptic feedback in response to the first amount of wireless power measured by the sensor circuit satisfying the power threshold.

6. The apparatus of claim 1, wherein the indication comprises haptic feedback in response to the first amount of wireless power measured by the sensor circuit not satisfying the power threshold.

7. The apparatus of claim 1, further comprising a memory configured to store the power threshold, wherein the power threshold is one of a plurality of selectable power thresholds stored in the memory, the power threshold selected by a manufacturer of the apparatus.

8. The apparatus of claim 1, further comprising a memory configured to store the power threshold, wherein the power threshold is one of a plurality of selectable power thresholds stored in the memory, the controller configured to select the power threshold based on one or more operating conditions of the apparatus.

9. A method for receiving wireless power, comprising:
   receiving a first amount of wireless power at a power receiving unit via a wireless field generated by a wireless power transmitter;
   measuring the first amount of wireless power; and
   providing an indication to a user on the power receiving unit whether at least a minimum power required to boot up a controller of the power receiving unit or establish communications with the wireless power transmitter, or a combination thereof has been met based on a comparison of the first amount of wireless power to a stored power threshold.

10. The method of claim 9, wherein the stored power threshold is at least the minimum power required to boot up the controller or establish communications with the wireless power transmitter, or the combination thereof.

11. The method of claim 9, wherein providing the indication comprises providing one or more indicators illuminated in response to the first amount of wireless power satisfying the stored power threshold.

12. The method of claim 9, wherein the providing the indication comprises providing one or more indicators illuminated in response to the first amount of wireless power not satisfying the stored power threshold.

13. The method of claim 9, wherein the providing the indication comprises providing haptic feedback in response to the first amount of wireless power satisfying the stored power threshold.

14. The method of claim 9, wherein providing the indication comprises providing haptic feedback in response to the first amount of wireless power not satisfying the stored power threshold.

15. The method of claim 9, wherein the stored power threshold is one of a plurality of selectable power thresholds stored in a memory, the stored power threshold selected by a manufacturer.

16. The method of claim 9, wherein the stored power threshold is one of a plurality of selectable power thresholds stored in a memory, the method further comprising selecting the stored power threshold based on one or more operating conditions.

17. A non-transitory, computer-readable medium comprising code that, when executed, causes an apparatus for receiving wireless power to:

receive a first amount of wireless power at a power receiving unit via a wireless field generated by a wireless power transmitter;

measure the first amount of wireless power; and provide an indication to a user on the power receiving unit whether at least a minimum power required to boot up a controller of the power receiving unit or establish communications with the wireless power transmitter, or a combination thereof has been met based on a comparison of the first amount of wireless power to a stored power threshold.

18. The medium of claim 17, wherein the stored power threshold is at least the minimum power required to boot up the controller or establish communications with the wireless power transmitter, or the combination thereof.

19. The medium of claim 17, wherein providing the indication comprises providing one or more indicators illuminated in response to the first amount of wireless power satisfying the stored power threshold.

20. The medium of claim 17, wherein providing the indication comprises providing one or more indicators illuminated in response to the first amount of wireless power not satisfying the stored power threshold.

21. The medium of claim 17, wherein providing the indication comprises providing haptic feedback in response to the first amount of wireless power satisfying the stored power threshold.

22. The medium of claim 17, wherein providing the indication comprises providing haptic feedback in response to the first amount of wireless power not satisfying the stored power threshold.

23. The medium of claim 17, wherein the stored power threshold is one of a plurality of selectable power thresholds stored in a memory, the stored power threshold selected by a manufacturer.

24. The medium of claim 17, wherein the stored power threshold is one of a plurality of selectable power thresholds stored in a memory, the code, when executed, further causing the apparatus to select the stored power threshold based on one or more operating conditions.

25. An apparatus for receiving wireless power, comprising:

means for receive a first amount of wireless power at the apparatus via a wireless field generated by a wireless power transmitter;

means for measuring the first amount of wireless power;

means for storing a power threshold; and means for instructing a feedback circuit to provide an indication to a user on the power receiving unit whether at least a minimum power required to boot up the apparatus or establish communications with the wireless power transmitter, or a combination thereof has been met based on a comparison of the first amount of wireless power to a selected one of the power threshold.

26. The apparatus of claim 25, wherein the power threshold is at least the minimum power required to boot up the apparatus or establish communications with the wireless power transmitter, or the combination thereof.

27. The apparatus of claim 25, wherein the indication comprises one or more indicators illuminated in response to the first amount of wireless power satisfying the power threshold or in response to the first amount of wireless power not satisfying the power threshold.

28. The apparatus of claim 25, wherein the indication comprises haptic feedback in response to the first amount of wireless power satisfying the power threshold or in response to the first amount of wireless power not satisfying the power threshold.

29. The apparatus of claim 25, wherein the power threshold is one of a plurality of selectable power thresholds stored in a memory, the power threshold selected by a manufacturer of the apparatus.

30. The apparatus of claim 25, wherein the power threshold is one of a plurality of selectable power thresholds stored in a memory, the apparatus further comprising means for selecting the power threshold based on one or more operating conditions of the apparatus.

* * * * *